United States Patent
Ghiotti et al.

(10) Patent No.: US 6,425,476 B2
(45) Date of Patent: *Jul. 30, 2002

(54) METHOD AND A DEVICE FOR THE FORMATION OF FLAT ARTICLES INTO GROUPS

(75) Inventors: Roberto Ghiotti, Calderino di Monte San Pietro; Antonio Gamberini, Bologna, both of (IT)

(73) Assignee: Azionaria Costruzioni Macchine Automatiche A.C.M.A. S.p.A., Bologna (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,100

(22) Filed: Jan. 19, 1999

(30) Foreign Application Priority Data

Apr. 2, 1998 (IT) .......................................... B098A0212

(51) Int. Cl.$^7$ ........................ B65G 47/26; B65G 33/02; B65G 37/00
(52) U.S. Cl. .................... 198/426; 198/419.3; 198/431; 198/467.1
(58) Field of Search ........................... 198/419.2, 419.3, 198/426, 422, 467.1, 431

(56) References Cited

U.S. PATENT DOCUMENTS

| | | | |
|---|---|---|---|
| 1,971,574 A | | 8/1934 | Moon et al. |
| 4,314,785 A | * | 2/1982 | LaFleur, Jr. et al. ..... 198/422 X |
| 4,399,905 A | * | 8/1983 | Lance et al. ............ 198/422 X |
| 4,469,217 A | * | 9/1984 | Meyer et al. ............ 198/419.2 |
| 4,564,104 A | * | 1/1986 | Anderson ................ 198/419.3 |
| 4,768,642 A | * | 9/1988 | Hunter ................ 198/419.3 X |
| 5,035,315 A | | 7/1991 | Fukusaki et al. |
| 5,127,209 A | * | 7/1992 | Hunter ................ 198/419.3 X |
| 5,161,664 A | * | 11/1992 | LeBras ................ 198/419.3 X |
| 5,176,244 A | * | 1/1993 | Radzins et al. ......... 198/430 X |
| 5,291,985 A | * | 3/1994 | Spatafora et al. ........ 198/419.3 |
| 5,595,280 A | | 1/1997 | Spatafora |
| 5,755,317 A | * | 5/1998 | Holston ............... 198/484.1 X |
| 5,884,749 A | * | 3/1999 | Goodman ............ 198/419.3 X |
| 5,887,701 A | * | 3/1999 | Spatafora ................ 198/431 X |
| 6,019,213 A | * | 2/2000 | Schubert ............... 198/419.3 X |
| 6,149,378 A | * | 11/2000 | Biondi et al. ........ 198/467.1 X |
| 6,260,689 B1 | * | 7/2001 | Takemoto et al. ... 198/484.1 X |

FOREIGN PATENT DOCUMENTS

| | | |
|---|---|---|
| DE | 40 02 724 A1 | 8/1991 |
| GB | 0 203 412 A | 10/1988 |
| WO | 90/12745 | 11/1990 |

* cited by examiner

*Primary Examiner*—Christopher P. Ellis
*Assistant Examiner*—Gene O. Crawford
(74) *Attorney, Agent, or Firm*—The Law Offices of Timothy J. Klima

(57) ABSTRACT

Flat articles to be formed into groups for packaging are advanced in succession at a set tempo toward a transfer station where each article is made to assume a predetermined position in space, standing on edge. Thereafter, the articles are advanced in a direction perpendicular to the position in space and toward a release station by means of a first conveyor equipped with pockets. The articles are caused to advance at a first linear velocity in such a way that each pocket receives an article and, at predetermined intervals, are accelerated to a second velocity for a predetermined duration between the arrival of one article at the transfer station and the arrival of the next article. In this way, one or more pockets remain empty, and groups of articles forming on the conveyor are separated one from the next by the empty pockets.

21 Claims, 1 Drawing Sheet

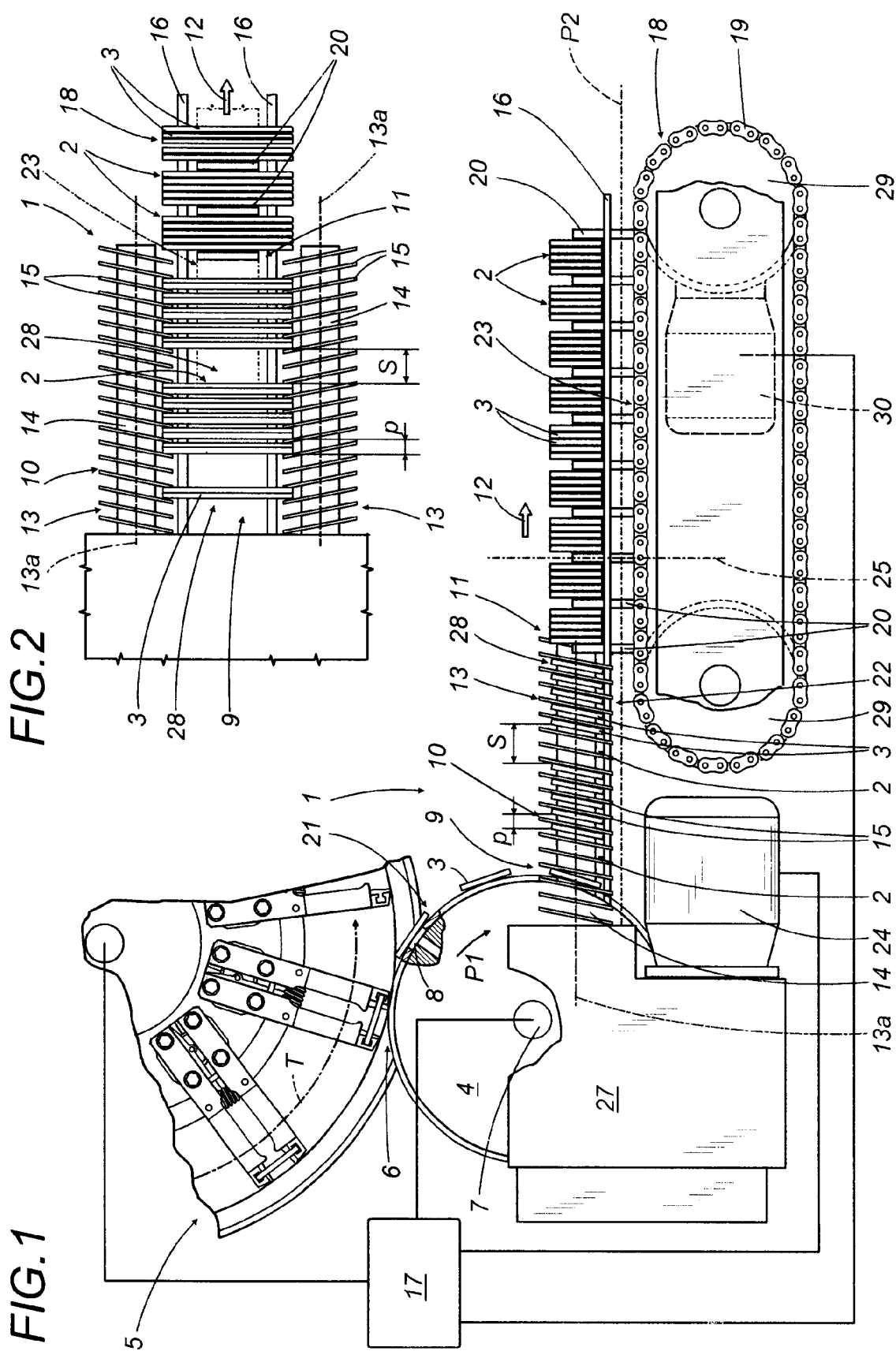

METHOD AND A DEVICE FOR THE FORMATION OF FLAT ARTICLES INTO GROUPS

BACKGROUND OF THE INVENTION

The present invention relates to a method for the formation of flat articles into groups.

The invention finds application to advantage in the food industry where there is a requirement for flat articles such as chocolates, toffees, cookies and the like to be arranged in groups; indeed reference is made in the following specification to this same art field, albeit implying no limitation in general scope.

The prior art embraces methods for the formation of flat articles into groups; in a first method, disclosed in UK Patent application No 2 203 412, the articles advance randomly along a horizontal conveying surface to a station where they are taken up singly onto the periphery of a vacuum wheel and directed toward a transfer station. Before entering the transfer station, the articles pass in front of a sensor serving to pilot the operation of a device by which each article in turn is detached from the wheel and added to a group, positioned on edge inside a magazine which is caused simultaneously to recede through a distance substantially identical to the thickness of the single article. During this formation step, the group is inclined relative to a horizontal plane and guided laterally by a fixed wall which the articles engage in sliding contact. Thereafter, having accumulated a selected number of articles, the magazine is rotated in such a manner as to release the already formed group of articles into a container, which is then directed toward further operating stations.

The formation of flat articles into groups by this method betrays certain drawbacks.

Firstly, the sliding contact between the articles and the fixed side wall can jeopardize the correct formation of a group of articles, for example, in the event that the articles should bind or stick as the result of sliding friction.

This is a drawback that significantly limits the operating speed of packaging equipment as described above.

Secondly, the receding movement of the magazine has the effect of jerking the articles, positioned in contact one with another, with the result that the articles themselves can suffer damage; this again dictates the need for the operating speed of the equipment to remain below a desirable higher value.

The operating speed is limited additionally by the brevity of the interval allowed in which to bring about the step of detaching the articles from the vacuum wheel, which is enabled by a sensor located immediately preceding the transfer station.

The prior art embraces another method, disclosed in U.S. Pat. No. 5,595,280, whereby the flat articles are advanced in an ordered succession toward a vacuum wheel furnished with pockets, each accommodating a single article. The articles are then taken up by a linear conveyor and caused to advance, positioned on edge, along a first feed direction and toward a transfer station where they are formed into groups and removed subsequently from the conveyor by an extractor device of which the action is produced by movement in a direction perpendicular to the first feed direction aforementioned.

This further method of forming articles into groups presents the drawback that the articles are made to pause at the transfer station, so that the groups can be distanced along the second feed direction and the risk of contact with successive articles advancing on the conveyor thus eliminated. The need to include a pause consequently occasions a certain reduction in the operating speed of the equipment.

The object of the present invention is to provide a method whereby flat articles standing on edge can be formed into groups without any of the drawbacks mentioned above.

SUMMARY OF THE INVENTION

The stated object is duly realized in a method according to the present invention for forming flat articles into groups, which comprises the steps of advancing a first succession of articles along a first path toward a transfer station, at a set tempo and in such a way that each article is caused to assume a predetermined position in space when occupying the transfer station, and advancing the articles through the agency of pocket type first conveyor means along a second path extending from the transfer station to a release station in a feed direction substantially normal to the position in space assumed by the articles, thereby creating a second succession of articles disposed on edge. The method disclosed also comprises the step of forming a succession of distinct groups along the pocket type first conveyor means, each consisting in a plurality of articles spaced apart at a given constant pitch, of which the last article in each group is distanced from the first article of the next group in succession by a gap of length greater than the pitch length, obtainable by selectively and controllably varying the linear velocity of the pockets of the first conveyor means with the passage of each group.

The present invention also relates to a device for the implementation of such a method.

In accordance with the invention, flat articles are formed into groups by a device comprising means by which to advance a first succession of articles along a first predetermined path toward a transfer station, at a set tempo and in such a manner that each article is caused to assume a predetermined position in space when occupying the transfer station, and first conveyor means affording pockets by which the articles are advanced along a second predetermined path extending from the transfer station to a release station in a feed direction substantially perpendicular to the position in space assumed by the articles, thereby creating a second succession of articles disposed on edge, wherein the linear velocity of the pockets afforded by the first conveyor means, and therefore the rate of feed at which the articles advance along the second path, can be selectively controlled in such a way as to allow the formation of a succession of distinct groups along the first conveyor means, each consisting in a plurality of articles spaced apart at a predetermined constant pitch, of which the last article in each group is distanced from the first article of the next group in succession by a gap of predetermined length greater than the pitch length.

BRIEF DESCRIPTION OF THE DRAWINGS

The invention will now be described in detail, by way of example, with the aid of the accompanying drawings, in which:

FIG. 1 illustrates a preferred embodiment of the device according to the present invention, viewed in elevation with certain parts omitted;

FIG. 2 shows the device of FIG. 1 in plan, with certain parts omitted.

DESCRIPTION OF THE PREFERRED EMBODIMENTS

Referring to FIG. 1 of the drawings, 1 denotes a device, in its entirety, serving to bring about the formation of groups 2 of articles 3 appearing flat and substantially parallelepiped in shape.

The device 1 comprises a conveyor wheel 4 by which the articles 3 are taken up from a transfer device denoted 5; as discernible in FIG. 1, the articles are advanced in succession by the transfer device 5 along a relative feed direction T toward a release station 6 where they are passed to the wheel 4.

The transfer device 5, which could take a variety of forms, is illustrated only in part and requires no description, being conventional in embodiment.

The wheel 4 is keyed to a shaft 7 located beneath the transfer device 5 and rotatable in a clockwise direction, as seen in FIG. 1, about a substantially horizontal center axis. The peripheral surface of the wheel 4 affords a plurality of suction holes 8 connected in conventional manner (not illustrated) to a source of negative pressure, also conventional and not illustrated. The embodiment of the suction holes 8 is such that each one can be occupied by a single article 3 and the articles thus retained on the periphery of the wheel 4, the function of the wheel 4 is to direct a first succession 21 of articles 3 along a first predetermined path PI toward a transfer station 9, in such a way that the single article 3 will reach the station 9 occupying a given position in space.

The wheel 4 operates at the transfer station 9 in conjunction with the infeed end of a first pocket conveyor 10 to be described in due course, of which the function is to direct a second succession 22 of the articles 3, positioned on edge, along a second predetermined path P2 extending from the transfer station 9 to a release station 11, advancing in a feed direction 12 substantially orthogonal to the axis of wheel 4 and to the aforementioned position in space occupied by the articles 3.

The first conveyor 10 comprises two feed screws 13 disposed side by side, with respective axes 13a extending parallel to the feed direction 12. The two screws 13 are interconnected mechanically in conventional manner through one or more gear pairs (not illustrated) housed internally of a case 27, and driven thus at identical angular velocities in opposite directions of rotation by a first motor 24 mounted to the case 27 and coupled to the gears.

Each feed screw 13 comprises a center shaft 14 coaxial with the respective axis 13a, and at least one flight 15 wound helically around the relative shaft 14 to form a plurality of successive single coils extending along the shaft 14.

In the example of the drawings, the feed screws 13 are constructed with two starts, and therefore with two flights 15, so that the coils advance through two helical pitch lengths with each full rotation of the shaft 14.

Each two adjacent coils of the single feed screw 13 combine to form one half of a conveying pocket 28 that is proportioned to accommodate one article 3 and translatable along the feed direction 12. As the pockets 28 advance, each article 3 is retained by its two opposite lateral extremities between the relative adjacent coils of the two feed screws 13. An intermediate portion of the article 3 rests on a conveying surface afforded by two guide rails 16 extending parallel to the feed direction 12 and occupying a position between the screws 13, below the level of the shafts 14.

A central monitoring and control unit 17 shown in FIG. 1 governs the speed of the first motor 24, and therefore the speed of rotation of the two feed screws 13 about the respective axes 13a.

To explain more clearly the device 1 for the formation of groups 2 of articles 3, both constructionally and in terms of its operation (of which a detailed description will follow in due course), the operation of the first conveyor 10 will now be explained briefly, first the configuration in which a first article 3 has been released by the wheel 4 into a relative pocket 28 afforded by adjacent successive coils of the feed screws 13 positioned correspondingly on each side will be described.

During the release step, the two feed screws 13 continue to be driven by the motor 24 at a first predetermined speed of rotation, synchronously with the wheel 4, in such a way that the articles 3 will be deposited singly into the respective pockets 28 generated in succession along and between the two feed screws 13, and caused to advance along the second path P2 at a first predetermined feed rate.

Once a group 2 of mutually adjacent articles 3 has accumulated to a selected number, the motor 24 is piloted by a signal from the control unit 17 to rotate at higher number of revolutions per minute, thereby increasing the angular velocity of the two feed screws 13.

The screws 13 now run at a second predetermined speed of rotation, no longer synchronous with the wheel 4, so that the rate at which the articles 3 advance along the second path P2 is accelerated relative to the first feed rate. In this way, one or more of the pockets 28 generated at the transfer station 9 will advance beyond the station before the next article 3 is released to the conveyor 10, and therefore remain empty.

It will be seen from this brief explanation that the groups 2 are formed directly on the conveyor 10 as and when the number of articles 3 accumulated is equivalent to one group 2, by causing the two feed screws 13 to rotate about their respective axes 13a at a higher speed, thereby accelerating the rate of feed and separating each group 2 from that next in succession by creating a gap of predetermined length denoted S in the drawings. More precisely, the higher speed of rotation of the feed screws 13 is maintained for a predetermined interval of time during which one or more pockets 28 will advance without receiving any articles 3 and thus remain empty. Naturally, the longer the screws are driven by the motor 24 at the higher speed of rotation, the more pockets will be left empty and the bigger the gap S between successive groups 2 will become. Similarly, the higher the speed of rotation of the feed screws 13 maintained for a given duration, the bigger the gap S will become.

The formation of the group 2 being completed, the control unit 17 pilots the motor 24 to reassume its former speed of rotation synchronous with that of the wheel 4, the feed screws 13 decelerate back to the first predetermined speed of rotation, and the articles 3 can once again be deposited by the wheel into each successive pocket 28 generated.

While in the particular example of the drawings each group 2 is formed with five articles 3, it will be possible clearly enough to form groups 2 composed of different numbers of articles 3 simply by reprogramming the timer functions of the control unit 17.

Also forming part of the device 1 are take up means 18 and compacting means 20 operating in conjunction with the feed screws 13 at the release station 11, by which the groups 2 are taken up and the single articles 3 compacted; more exactly, such means comprise a second conveyor denoted 18, of which the infeed end is positioned to receive the groups 2 of articles formed while advancing along the screws 13 in the relative feed direction 12.

The conveyor 18 comprises a flexible element 19 shown as a chain in the example illustrated, looped around respective wheels 29 of which one is power driven by a motor 30 interlocked to the monitoring and control unit 17, thereby ensuring that at least the top, active branch 23 of the chain 19 can be advanced along the second path P2 and in the second direction 12 synchronously with the feed screws 13, at a substantially constant speed. In the example of the drawings, the top branch 23 of the second conveyor 18 is made to advance at a linear velocity slower than the rate at which the single groups 2 of articles 3 approach the release station 11, for reasons that will become apparent.

The chain carries a plurality of projections 20 performing the function of locating and restraining elements, in conventional manner, which are spaced apart at a predetermined distance and insertable thus into the gaps S between successive groups 2. The projections 20 are also capable individually of movement produced by drive means (conventional in embodiment and therefore not illustrated), relative to the chain 19 and along a third path 25 normal to the second path P2, in such a manner as to assume at least a retracted position substantially within the compass of the looped conveyor 18, in which the projection 20 neither makes contact nor interacts with the groups 2 of articles 3, and an extended position in which the projection 20 protrudes from the conveyor 18 and locates in the gap S separating two successive groups 2 about to be released by the feed screws 13.

In operation, the articles 3 are indexed by the transfer device 5 to the release station 6 where they are taken up onto the wheel 4, retained by suction in contact with the revolving peripheral surface and caused to advance continuously toward the transfer station 9; during this initial step the articles 3 proceed in a first succession 21, moving along the first path P1 at a selected tempo, spaced apart at a regular distance, and completing a rotation of 90° or thereabouts about the axis of the wheel 4.

As each of the holes 8 in turn passes through the transfer station 9, suction discontinues and the article 3 retained hitherto can drop freely into a relative pocket 28 of the conveyor 10.

The feed screws 13 are caused by the motor 24 to turn at a first predetermined speed of rotation synchronized with that of the wheel 4, that is to say, timed in such a way that the arrival of an article 3 at the transfer station 9 coincides with the moment when a pocket 28 is generated at the station, which will be maintained until the wheel has deposited articles into a predetermined number of consecutive pockets 28.

The irregular situation of an article 3 failing to associate with one of the suction holes 8 will be indicated to the monitoring and control unit 17, which is also wired to conventional sensing means (not illustrated) located on the feed direction T along which the articles 3 are directed toward the wheel 4 by the transfer device 5. The sensing means in question are able to provide the control unit 17 with a signal indicating the presence or absence of articles 3 on the transfer device 5.

In the event that an article 3 should indeed fail to materialize on the corresponding suction hole 8, the control unit 17 will cause the feed screws 13 to stop or decelerate so as to wait for the next article 3 in succession and avoid leaving an empty pocket 28. Once the last article 3 of a group 2 has passed from the wheel 4 to the relative pocket 28, the control unit 17 pilots an increase in the speed of rotation of the screws 13, to be maintained for a given duration in the manner described above, so that before the next article 3 in succession can reach the transfer station 9, at least one pocket 28 will have been generated without being filled.

In the example illustrated, five pockets 28 are filled consecutively with respective articles 3 and two pockets 28 then left empty.

As groups 2 of articles 3 form along the feed screws 13, the articles 3 making up each group are caused to advance spaced apart one from the next at a selected pitch denoted "p". In the event that the feed screws 13 have two starts, as described above, the single articles 3 will be spaced apart one from the next at a distance corresponding to half the pitch of the screw 13.

In the example illustrated, the gap S is produced by spacing the groups 2 apart one from the next at a distance greater than one pitch length "p", and equal to a whole number multiple of the pitch.

As one or more empty pockets 28 reach the release station 11, a projection 20 will be advanced by the drive means from the retracted position toward the extended position, locating in a relative pocket 28 without touching the flights 15 and taking up a position in the gap S between successive groups 2 just before the final article 3 of a group 2 is released fully by the screws 13, as in FIG. 2.

With the top branch 23 of the chain 19 advancing at a slower linear velocity, the first article 3 of the group 2 locates against the projection 20 and consequently is decelerated relative to the other articles 3 of the same group 2, which continue to advance at the higher speed as explained above. As a result, the articles 3 of the group 2 are brought into contact one with the next and duly compacted.

Importantly, the chain 19 will be driven by the motor 30, of which the operation is interlocked to the control unit 17, at a velocity such that the articles 3 of a given group 2 are compacted without any impact occurring.

To form groups 2 made up of a different number of articles 3, the monitoring and control unit 17 must be reprogrammed and the projections 20 rearranged on the flexible element 19 as appropriate.

In the example illustrated, articles 3 approach the device 1 in an ordered succession, spaced apart at a predetermined and constant pitch, although it would be quite possible to adopt an infeed system whereby the articles 3 enter in random rather than ordered succession. In this instance, use would be made of a sensor located near the vacuum wheel 4 and preceding the transfer station 9 at which the articles 3 are taken up by the pockets 28 of the first conveyor 10, the function of the sensor being to detect the passage of an article 3 and relay a signal to the monitoring and control unit 17, which would then pilot the pocket conveyor 10 to respond in the manner described above.

It will be evident from the foregoing description that the articles 3 advance through the device 1 first singly, then ordered into groups, but never isolated from the device and never moving from any one point to the next in an uncontrolled manner. In particular, the formation of successive groups 2 is brought about along the feed screws 13 and effected simply by regulating the speed of rotation of the selfsame screws, hence in a permanently controlled manner. Moreover, the advancing articles 3 are not brought into contact with one another until they have passed beyond the release station 11, by which time the formation of the groups 2 is complete, so that the risk of any article 3 striking an obstacle or another article 3 in an uncontrolled manner is eliminated.

What is claimed is:

1. A method for the formation of flat articles into groups, comprising:

advancing a first succession of articles along a first path toward a transfer station at a predetermined speed;

advancing the articles in respective pockets of a single first conveyor along a second path extending from the transfer station to a release station in a feed direction, creating a second succession of articles disposed on edge;

forming a succession of distinct groups along the first conveyor, each group comprising a plurality of articles spaced apart at a predetermined and constant pitch, wherein the last article in each group is distanced from the first article of the next group in succession by a gap having a length equal to a whole number multiple of the pitch, obtained by selectively and controllably varying the linear velocity of the pockets of the first conveyor with the passage of each group.

2. A method according to claim 1, wherein all of the pockets move uniformly, at the same linear velocity.

3. A method as in claim 1, wherein forming the distinct groups by selectively varying the linear velocity of the pockets comprises: advancing the pockets at a first linear velocity, timed with the movement of the first succession of articles and maintained for a first duration; and causing the pockets to advance at a second linear velocity greater than the first linear velocity after a given number of articles are accumulated to form one group, such that at least one pocket advances without receiving an article and the group remains separated from a group next in succession by a gap of a predetermined length proportionate to a second duration for which the second linear velocity is maintained.

4. A method as in claims 1 or 3, wherein the first conveyor further comprises:

two feed screws contrarotating about respective axes, each feed screw comprising a center shaft and at least one flight wound helically about the shaft to form a succession of single coils along the respective axis, each two successive coils of either screw combining with two corresponding coils of the other screw to create a pocket to accommodate and convey one relative article.

5. A method as in claim 1 or 3, comprising:

taking up each successive group formed by the first conveyor means and compacting the single articles thereof.

6. A method as in claim 5, wherein taking up and compacting the groups is effected at the release station and comprises taking up each group of articles individually onto a second conveyor operating synchronously and in conjunction with the first conveyor and incorporating at least an active branch caused to advance in a direction coinciding substantially with the feed direction.

7. A method as in claims 1 or 3, comprising:

taking up each successive group formed by the first conveyor and compacting the single articles thereof at the release station by taking up each group of articles individually onto a second conveyor operating synchronously and in conjunction with the first conveyor and incorporating at least an active branch caused to advance in a direction coinciding substantially with the feed direction at a linear velocity lower than the second linear velocity of the first conveyor.

8. A method as in claim 7, employing a second conveyor equipped with a plurality of projections ordered in succession along the second path, each projection separated one from the next by a distance substantially equal to the selected depth of the compacted group of articles and capable thus of movement along the feed direction, wherein each projection is capable also of movement along a third path perpendicular to the second path, and movable to a retracted position neither making contact nor interacting with the groups of articles, and an extended position protruding from the conveyor and insertable into the gap between two successive groups released by the first conveyor, such that a forwardmost article of the oncoming group is engaged and decelerated, causing the articles of the group to be compacted together.

9. A method as in claim 7, where taking up and compacting the successive groups formed by the first conveyor comprises at least the active branch of the second conveyor advancing in a direction coinciding substantially with the feed direction at a linear velocity lower than the first linear velocity of the first conveyor means.

10. A device for the formation of flat articles into groups, comprising:

a transfer station;

an in-feed system adapted to advance a first succession of articles along a first path toward the transfer station, at a set tempo;

a single first conveyor having pockets in which the articles are advanced along a second path extending form the transfer station in a feed direction, creating a second succession of articles disposed on edge; and a release station, located at an end of the second path remote from the transfer station, wherein the linear velocity of the pockets of the first conveyor can be selectively controlled so as to allow the formation of a succession of distinct groups along the first conveyor, each group comprising a plurality of articles spaced apart at a predetermined constant pitch, of which a last article in each group is distanced from a first article of a next group in succession by a gap of predetermined length equal to a whole number multiple of the pitch.

11. A device according to claim 10, wherein the conveyor includes a screw and the pockets being formed by a portion of the screw.

12. A device as in claim 10, further comprising a monitoring and control unit adapted to control the operation of the first conveyor at first and second linear velocities of which the respective values are predetermined relative to the means of advancing the first succession of articles.

13. A device as in claim 12 comprising a take-up positioned proximate the release station and operating in conjunction with the first conveyor, by which the successive groups are taken up and the single articles of each group compacted.

14. A device as in claim 13, wherein the take-up comprises a second conveyor, equipped with elements positioned to locate and restrain each group of articles, and an active branch of the second conveyor is caused to advance in a direction coinciding substantially with the feed direction.

15. A device as in claim 14, wherein the pocket type first conveyor comprises:

two feed screws contrarotating about respective axes, each feed screw comprising:

a center shaft, and at least one flight wound helically about the shaft to form a succession of single coils along the respective axis, each two successive coils of either screw combining with two corresponding coils of the other screw to create a pocket to accommodate and convey one relative article.

16. A device as in claim 14, wherein the active branch of the second conveyor is caused to advance at a linear velocity less than the second linear velocity of the pockets of the first conveyor.

17. A device as in claim 14, wherein the active branch of the second conveying means is caused to advance at a linear velocity less than the first linear velocity of the pockets of the first conveyor.

18. A device for the formation of flat articles into groups, comprising:

a transfer station;

an in-feed system adapted to advance a first succession of articles along a first path toward the transfer station, at a set tempo;

a first conveyor having pockets in which the articles are advanced along a second path extending from the transfer station in a feed direction creating a second succession of articles disposed on edge;

a release station, located at an end of the second path remote from the transfer station;

a monitoring and control unit adapted to control the operation of the first conveyor at first and second linear velocities of which the respective values are predetermined relative to the means of advancing the first succession of articles; and a take-up, positioned proximate the release station and operating in conjunction with the first conveyor, by which the successive groups are taken up and the single articles of each group compacted, wherein the linear velocity of the pockets of the first conveyor can be selectively controlled so as to allow the formation of a succession of distinct groups along the first conveyor, each group comprising a plurality of articles spaced apart at a predetermined constant pitch, of which a last article in each group is distanced from a first article of a next group in succession by a gap of predetermined length greater than the pitch length, wherein the take-up comprises a second conveyor, equipped with elements positioned to locate and restrain each group of articles, and an active branch of the second conveyor is caused to advance in a direction coinciding substantially with the feed direction, wherein the locating and restraining elements comprise a plurality of projections arranged in succession and translatable along the feed direction, and capable individually also, at the release station, of assuming a position of engagement with a corresponding empty pocket in which the single projection is interposed between two successive groups of articles.

19. A device as in claim 18, wherein each projection is capable of movement along a third path perpendicular to the second path, assuming at least a retracted position within the dimensional compass of the conveyor, neither making contact nor interacting with the groups of articles, and an extended position protruding from the conveyor and insertable into the gap between two successive groups released by the first conveyor, in such a way as to afford a locating element by which the forwardmost article of the oncoming group is engaged and decelerated, causing the articles of the group to be compacted together.

20. A method for the formation of flat articles into groups, comprising:

advancing a first succession of articles along a first path toward a transfer station at a predetermined speed;

advancing the articles in respective pockets disposed in continuous succession in a single first conveyor along a second path extending from the transfer station to a release station in a feed direction, creating a second succession of articles disposed on edge;

forming a succession of distinct groups along the first conveyor, each group comprising a plurality of articles spaced apart at a predetermined and constant pitch, wherein the last article in each group is distanced from the first article of the next group in succession by a gap having a length greater than the pitch, obtained by selectively and controllably varying the linear velocity of the pockets of the first conveyor with the passage of each group.

21. A device for the formation of flat articles into groups, comprising:

a transfer station;

an in-feed system adapted to advance a first succession of articles along a first pat toward the transfer station, at a set tempo;

a single first conveyor having pockets disposed in continuous succession, the articles advancing in said pockets along a second path extending from the transfer station in a feed direction creating a second succession of articles disposed on edge; and a release station, located at an end of the second path remote from the transfer station, wherein the linear velocity of the pockets of the first conveyor can be selectively controlled so as to allow the formation of a succession of distinct groups along the first conveyor, each group comprising a plurality of articles spaced apart at a predetermined constant pitch, of which a last article in each group is distanced from a first article of a next group in succession by a gap of predetermined length greater than the pitch.

* * * * *